(12) United States Patent
Chiles

(10) Patent No.: US 9,855,483 B2
(45) Date of Patent: Jan. 2, 2018

(54) ADJUSTABLE GOLF TRAINING SYSTEM

(71) Applicant: Eric Steven Chiles, Excelsior, MN (US)

(72) Inventor: Eric Steven Chiles, Excelsior, MN (US)

( * ) Notice: Subject to any disclaimer, the term of this patent is extended or adjusted under 35 U.S.C. 154(b) by 0 days.

(21) Appl. No.: 15/619,476

(22) Filed: Jun. 10, 2017

(65) Prior Publication Data

US 2017/0282041 A1    Oct. 5, 2017

Related U.S. Application Data

(63) Continuation-in-part of application No. 15/087,083, filed on Mar. 31, 2016.

(51) Int. Cl.
| | |
|---|---|
| *A63B 69/36* | (2006.01) |
| *A63B 71/02* | (2006.01) |
| *G09B 19/00* | (2006.01) |

(52) U.S. Cl.
CPC ........ *A63B 69/3641* (2013.01); *A63B 71/023* (2013.01); *G09B 19/0038* (2013.01); *A63B 2071/024* (2013.01); *A63B 2225/093* (2013.01)

(58) Field of Classification Search
USPC .......................... 473/219, 257–266, 271–277
See application file for complete search history.

(56) References Cited

U.S. PATENT DOCUMENTS

| | | | | |
|---|---|---|---|---|
| 6,343,998 B1* | 2/2002 | Tarulli | ............... | A63B 69/0057 473/273 |
| 6,988,957 B2* | 1/2006 | Bender | ............. | A63B 69/0057 473/266 |
| 7,431,661 B1* | 10/2008 | Cailey | .................... | A63B 67/02 473/257 |
| 7,946,927 B2* | 5/2011 | Bowers | .............. | A63B 69/3641 473/257 |
| 8,425,343 B1* | 4/2013 | Olmos | ............... | A63B 69/0057 473/257 |
| 2002/0165037 A1* | 11/2002 | Stitz | .................... | A63B 69/0057 473/257 |

* cited by examiner

*Primary Examiner* — Nini Legesse
(74) *Attorney, Agent, or Firm* — Mark A. Litman & Associates, P.A.

(57) ABSTRACT

A golf swing training device comprising has a support base for contacting a support surface, such as the ground. There is a vertical support element extending upward from the support base having a lateral support arm transverse on the vertical support element with a relatively left side and a relatively right side. The lateral support arm has two directional arms extending in a forward direction away from the lateral support arms. The lateral support arm has a rotation-enabling connection to the vertical support element so that the relatively left side can be elevated above the relatively right side, and alternatively the relatively right side may be elevated above the relatively left side to alter the individual respective heights of the two arms.

19 Claims, 8 Drawing Sheets

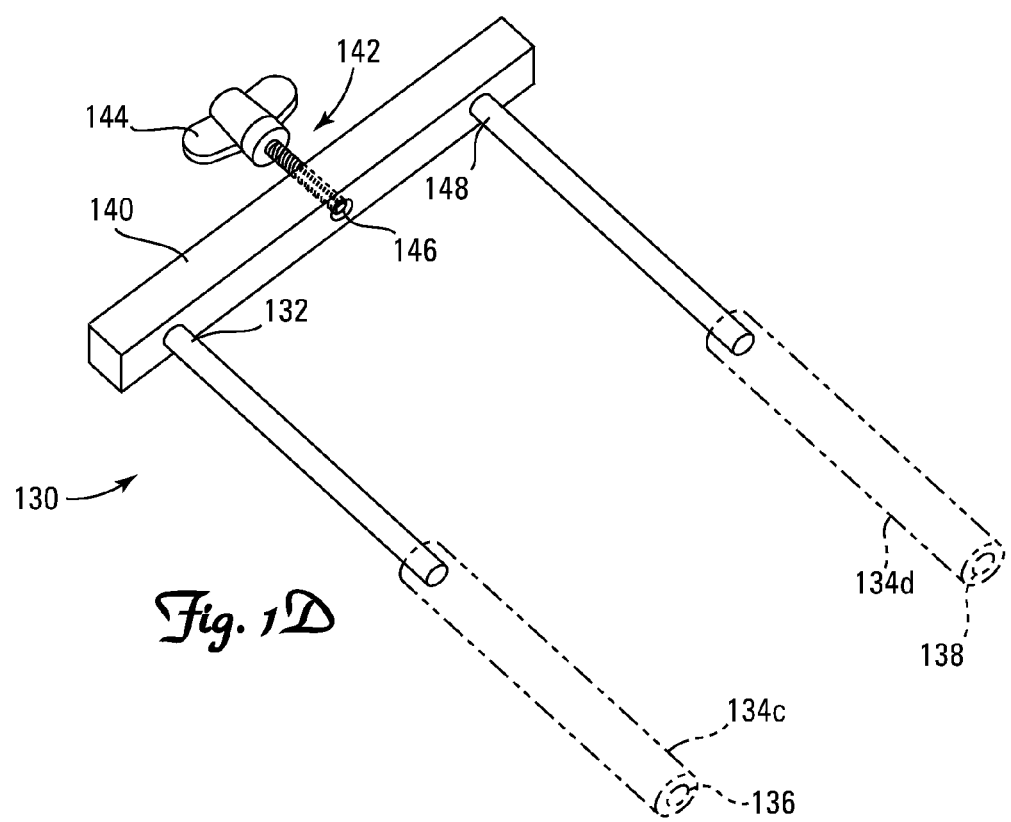

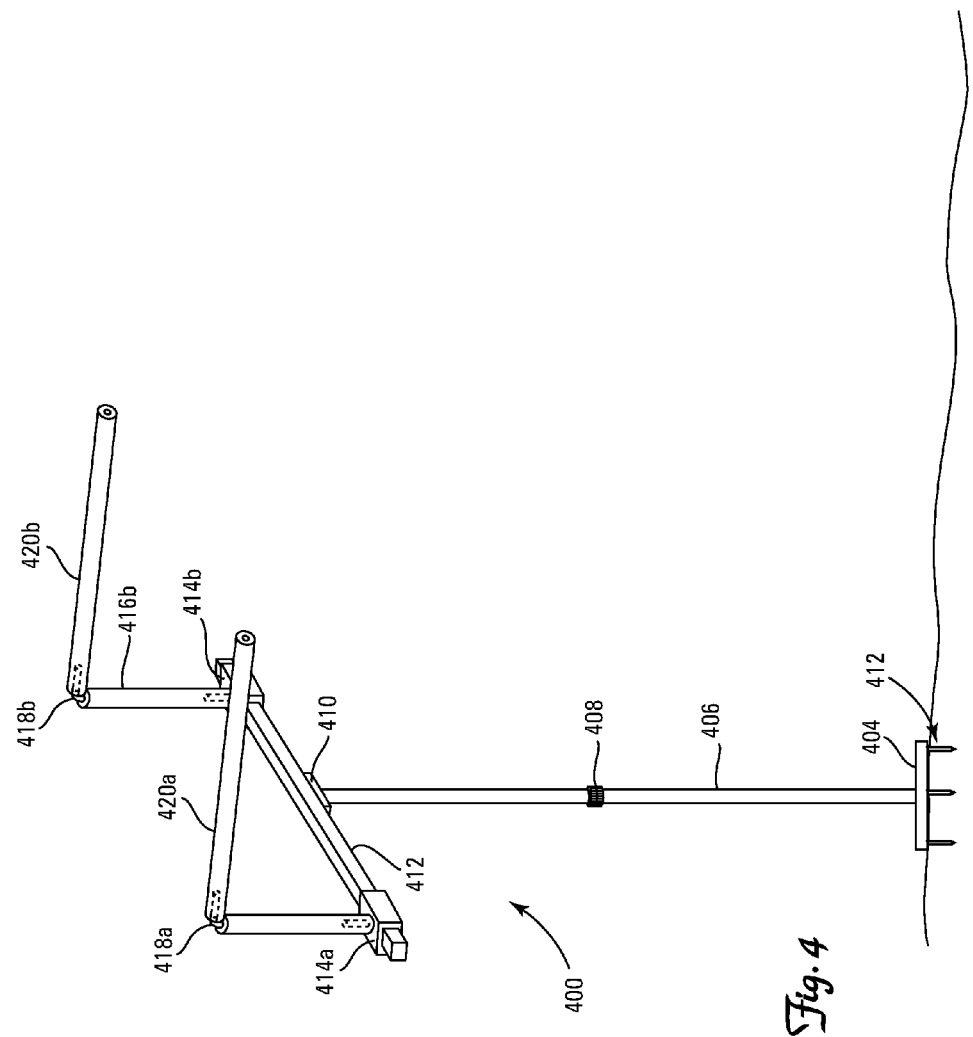

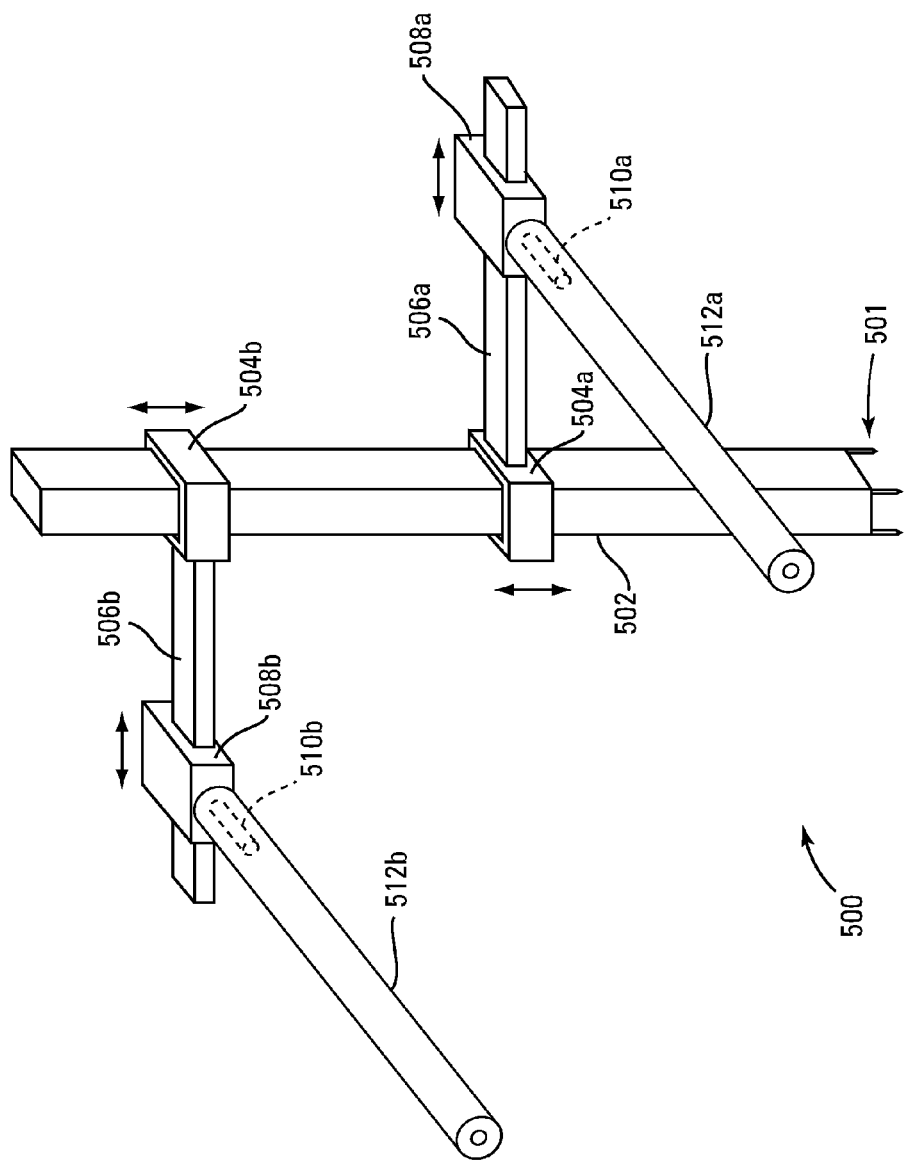

FIGURE 6

| Provide golf-training device as in figure 2 |

| Adjusting the device of Figure 2 to accommodate a golfer of a size, including extending arm sleeves as in Figure 1D |

| Positioning a golfer's body in relationship to the golf-training device as in Figure 3 |

| Position the golfer holding the club with the club head on the ground |

| The golfer elevating the club head and lifting the shaft between extending arms of the device |

| As in Figure 3, taking a partial back swing with the golf club |

| Returning the golf club head to the ground by the player executing a forward swing with the club |

ADJUSTABLE GOLF TRAINING SYSTEM

RELATED APPLICATION DATA

This Application claims priority as a Continuation-in-Part from U.S. patent application Ser. No. 15/087,083 filed 31 Mar. 2016 and titled "ADJUSTABLE GOLD TRAINING SYSTEM, which in turn claims priority from U.S. Provisional Patent Application Ser. No. 62/148,945, filed 17 Apr. 2015, which is incorporated herein by reference.

BACKGROUND OF THE INVENTION

1. Field of the Invention

The present invention relates to the field of the game of golf, to instruction in golf and apparatus used to assist in instruction, training and practice of golf.

2. Background of the Art

Golf is a popular sport and significant time is spent on practice and training and significant amounts of money are spent on training devices. Many of the devices are simplistic and provide no real value, as comically observed in the Movie, Tin Cup, starring Kevin Costner and Rene Russo. Other devices that may well have significant beneficial effects are very difficult to use and practice with and may, without constant revisiting of instruction, lead to swings that are modified in artificial ways that do not improve the golf swing. One of the more common and effective swing tools in use are simple sticks laid on the ground which offer so perspective to the player as to the direction that the club head is moving immediately before, during and immediately after the intended point of impact with the golf ball. Although this last system has some definite benefits, those benefits are limited.

Recently, a highly complex computer-based and physically club/hand controlled robotic training system has been introduced. These include the RoboGolfPro™ device and devices manufactured by GolfAid, Inc. These are very expensive devices that add artificial resistance within the golf swing that is unnatural during actual play.

SUMMARY OF THE INVENTION

A golf swing training device comprising has a support base for contacting a support surface, such as the ground. There is a vertical support element extending upward from the support base having a lateral support arm transverse on the vertical support element with a relatively left side and a relatively right side. The lateral support arm has two directional arms extending in a forward direction away from the lateral support arms. The lateral support arm has a rotation-enabling connection to the vertical support element so that the relatively left side can be elevated above the relatively right side, and alternatively the relatively right side may be elevated above the relatively left side to alter the individual respective heights of the two arms.

The present invention provides golfers with a simple, adjustable golf swing training method, designed to help the golfer create an effective swing. Due to the adjustability and uniqueness of the invention, it is effective with the full range of golfers, beginner to professional. Additionally, due to the unique design the device is highly portable and can be quickly set up and used inside the home, in the yard, and on the golf range.

BRIEF DESCRIPTION OF THE FIGURES

FIG. 1D shows the sleeves of the directional arms adjusted forward.

FIG. 4 is a perspective view of a telescoping vertical support element having a multi-prong base for ground stabilization, adjustable lateral support arm, and adjustable vertical riser arms, and adjustable directional arms with soft tubular elements.

FIG. 5 is a perspective view of a telescoping vertical support with adjustable vertical support members and adjustable lateral support members with directional arms and soft tubular elements.

FIG. 6 shows a flow chart for the steps of the method.

DETAILED DESCRIPTION OF THE INVENTION

Figure 1A:
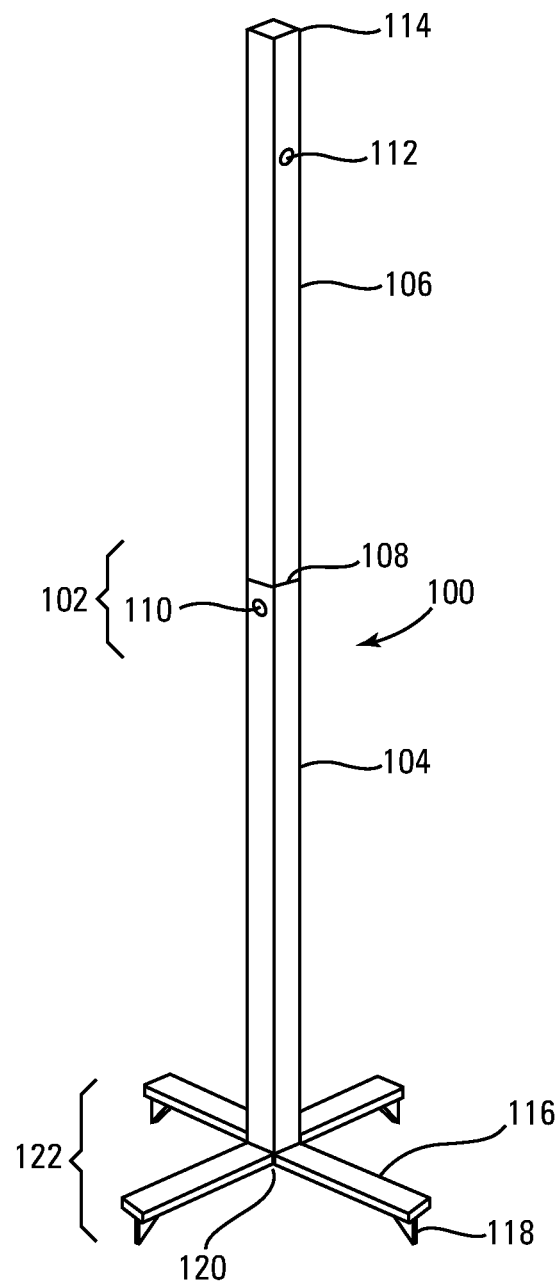
FIG. 1A is a perspective view of a telescoping vertical support element having a four-pronged support base for penetrating a support surface.

A golf swing training device comprising has a support base for contacting a support surface, such as the ground. There is a vertical support element extending upward from the support base having a lateral support arm transverse on the vertical support element with a relatively left side and a relatively right side. The lateral support arm has two directional arms extending in a forward direction away from the lateral support arms. The lateral support arm has a rotation-enabling connection to the vertical support element so that the relatively left side can be elevated above the relatively right side, and alternatively the relatively right side may be elevated above the relatively left side to alter the individual respective heights of the two arms.

The support surface may be a floor, the ground, a carpet, artificial turf or any other relatively horizontal surface that can support the device in a stable position, where it can be adjusted and not topple. The support base may simply rest on the support surface or connect to the support surface. For example, the support base may be a plate, a tripod, posts, legs, a table, a hemisphere or the like, made of any structurally sound material such as metal, polymers, composites, wood and combinations thereof. These materials may be generally used for most of the components and elements of the device, except for the later described sleeves.

The vertical support element may have a lockable, vertically telescoping construction so that a contact area between the vertical support element and the lateral support element with respect to the support base may be adjusted vertically. This construction may have one or more posts that secure the device to the support surface (even a simple pointed pole that penetrates the ground to secure the device). There may be a locking element between the vertical support element and the lateral support element that allows vertical movement of the lateral support element with respect to the support base along the vertical support element.

The device may have the support base as an at least three leg base with a central connector engaging the at least three legs. This tripod-like component may be very similar to or modified from standard photographic tripods used to support cameras during photographic sessions. The central connector may be similar to the base plate (e.g., with an upwardly facing bolt, threaded or not) on a photographic tripod, except that here the plate would attach to and support and allow various orientation positions of the lateral support arm.

The lateral support element may swivel from a position parallel with the support surface to at least about at least ±30°, at least ±45° or at least ±60° from the horizontal, which the support surface is presumed to be. The support surface may also be at an angle to the horizontal to assist in training golf swing motions on surfaces that are not level, such as downhill, uphill and side-hill lies.

The device may provide each of the directional arms with a tension gripping sleeve overlaying at least 25% of surface of the directional arms. The sleeves may actually extend to and beyond the ends of the directional arms, so that only a portion of the axis within the sleeve has a solid material (such as the directional arm) within the sleeve. The tension gripping sleeve may be a fabric (e.g., stiff fabric with elastic to allow the gripping action), flexible rubber tubing stiff enough to extend away from the lateral arms, foam tubing with a central axial opening that can slip over the directional arms with tension, slit foam tubing that may be pressed over the directional arms and grip the arms, and the like. It is preferred to use foam tubing in one form or another as impact with the tubing by a golf club will bot damage the club face and may, at worst, merely dislodge the sleeve from the directional arm.

The device may provide the tension gripping compressible sleeve as a compressible foam sleeve having a surface hardness less than that of stainless steel or brass. The lower surface hardness is desirable to prevent scratching of the club face when it contacts the sleeves. The compressible foam sleeves may be made of synthetic polymer foam (polyethylene, polypropylene, polyurethane and the like) sleeves that grip respective directional arms so that the foam sleeves will not slide off the respective directional arms when the directional arms are tilted downward at a 60° angle.

The two directional arms may be each separately slideable and position lockable along the lateral support arm. The lateral support arm may be pivotable with respect to the support surface and may be locked and unlocked with respect to an angled position parallel to or angled away from the support surface.

Referring to the Figures will further assist in appreciating the details of the present invention.

FIG. 1A is a perspective view of a telescoping vertical support component 100 having a four-pronged support base 122 for penetrating a support surface (not shown, e.g. ground). The support element 100 is shown with a telescoping vertical support element 102 having a lower shaft 104 that is shown enclosing an upper shaft 106 to form the telescoping joint 108 joining the shafts 104, 106 of the telescoping vertical support element 102. A hole 110 is shown for a bolt or screw tightening pin (not shown) to lock against telescoping when the device is in use. A hole 112 is shown for later engagement with lateral support arms (shown in FIGS. 1B and 1C). The top 114 of the telescoping vertical support component 100 is where a plate (shown in FIG. 2) would be secured to alternatively support the lateral arms (shown in FIG. 2). The base support element 122 is shown as a four-pronged base support element 122, with four legs 116 having four individual spikes 118, with the legs joined at the bottom of the telescoping vertical support component 100.

Figure 1B:
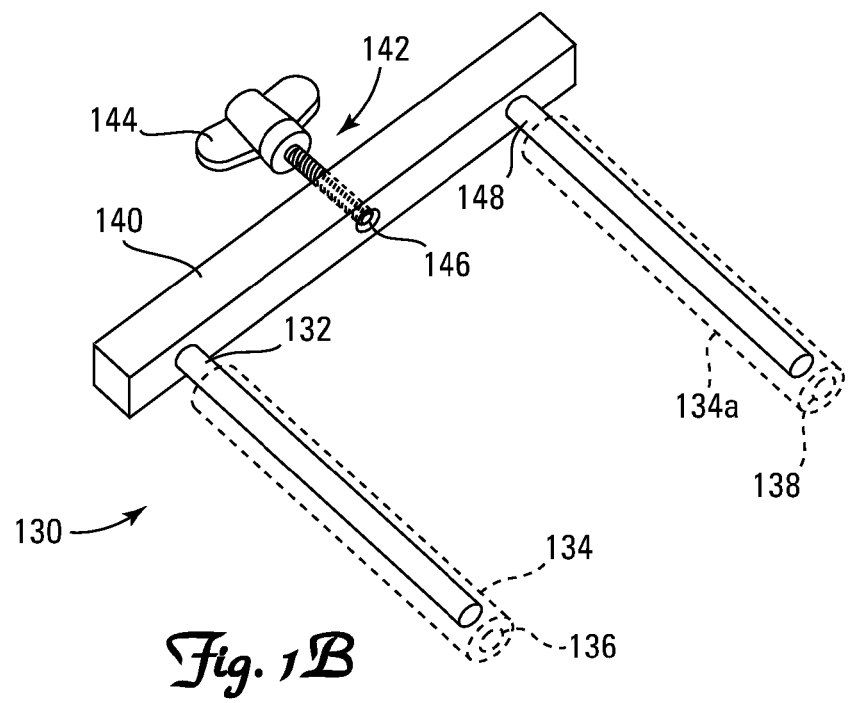
FIG. 1B is a perspective view of a lateral support arm with two directional arms.

FIG. 1B is a perspective view of a lateral support arm 130 with two directional arms 132. The lateral support arm 130 has a lateral support shaft 140 with a through hole 146 shown for penetration by a tightening/locking pin 142 that can be placed (as shown) with the finger grasp plate 144 behind the telescoping vertical support component 100 (in FIG. 1A) through the hole 112 (FIG. 1A) or the tightening/locking pin 142 that can be placed with the finger grasp plate 144 in front of the telescoping vertical support component 100 (in FIG. 1A) through the hole 112 (FIG. 1A). The positioning of (for example) foam polymeric sleeves 134 over the direction arms 132 is shown. The use of a slit 138 through a sleeve 134a is shown such that the sleeve 134a can be placed over the direction arm 148 by pressing the slit 138 against the direction arm 148 to open the slit 138 and allow the sleeve 134 to securely grip the direction arm 148 by compressive or elastic tension of the sleeve against the direction arm 148.

Figure 1C:
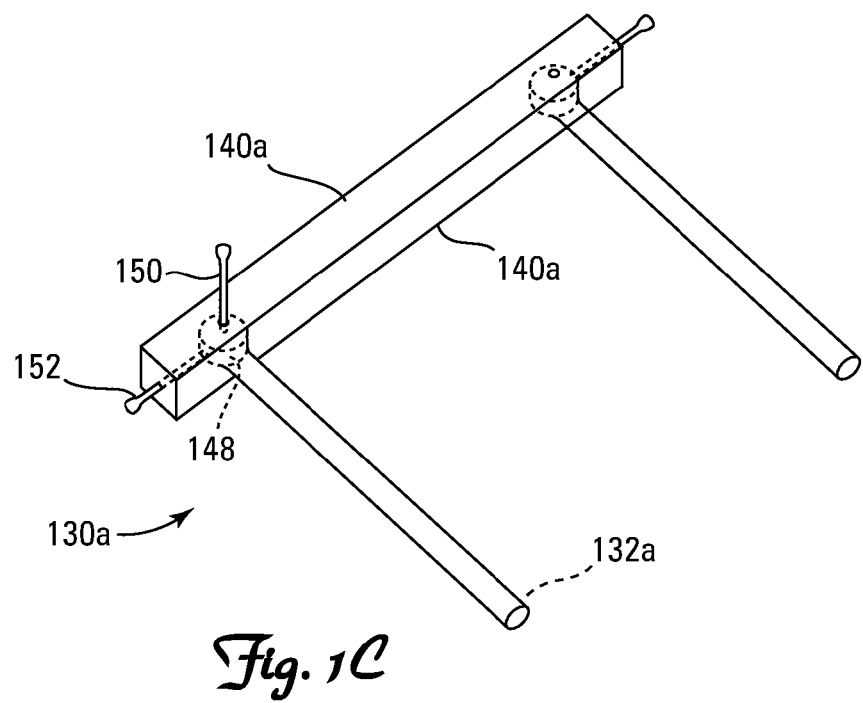
FIG. 1C is a perspective view of a lateral support arm with two pivoting directional arms.

FIG. 1C is a perspective view of a lateral support arm 130a with two pivoting directional arms 132a. The directional arms 132a are at least partially retained within the lateral support shaft 140a and may be locked into either or both of an up-and-down movement of the directional arm 132a and movement parallel to the longest dimension of the lateral support arm 130a by bolts 150 and 152 that can be tightened to grip an internal swiveling element 148.

Figure 2:
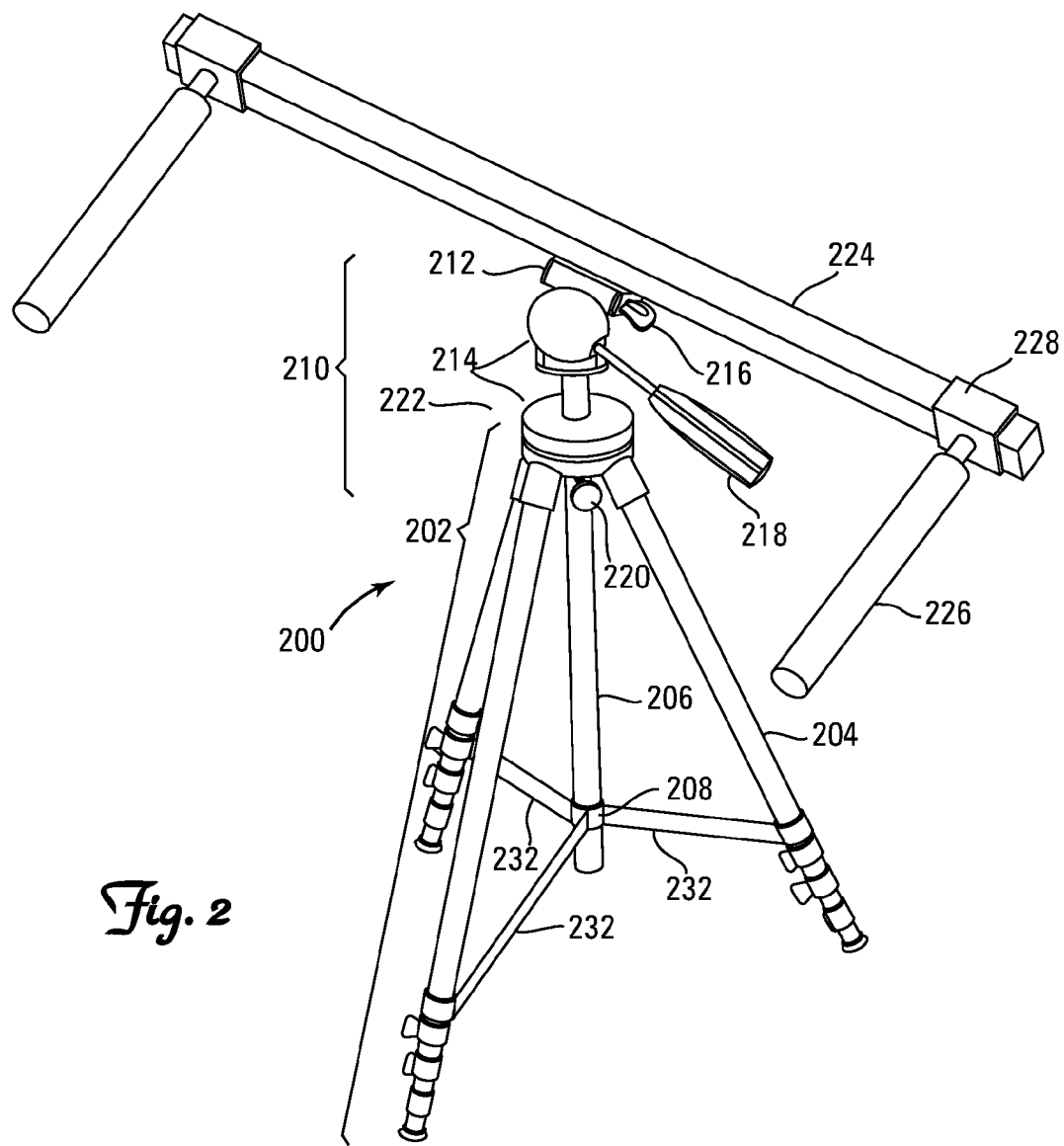
FIG. 2 is a perspective view of a telescoping tripod support device with slideable direction arms on a lateral support titled with respect to the horizontal support surface, a floor.

FIG. 2 is a perspective view of a telescoping tripod support device 200 with slidable direction arms 226 on a lateral support bar 224 tilted with respect to the horizontal support surface, e.g., a floor. The slideable direction arms 226 are carried by sliding elements 228 that may be slid and locked on the tilted lateral support bar. A tripod support assembly 220 is part of the previously discussed telescoping vertical support element of FIG. 1A. There are three legs 204 which are connected through an adjustable collar 208. A telescoping vertical support assembly 206 is supported by the arms 232 and rises through the device 200 to a connecting assembly 210 that includes an uppermost (top) section of the telescoping vertical support 222 a pivoting connector 214 (here a rotating and pivoting connector), a top connector 212 locked into the lateral support bar 224. Locking elements 216 (for the top connector 212), 218 (for the pivoting connector 214) and telescoping element connector 220 (for joining the pivoting connector 214 and the uppermost section of the telescoping vertical support 222 are also shown. These locking elements 216, 218 and 220 may be turned to lock and unlock respective part movement. The foot 230 of the device 200 may be structured to rest on indoor flooring without scratching the surface or may have spikes (as in FIG. 1A) to dig into ground for stabilization.

Figure 3:
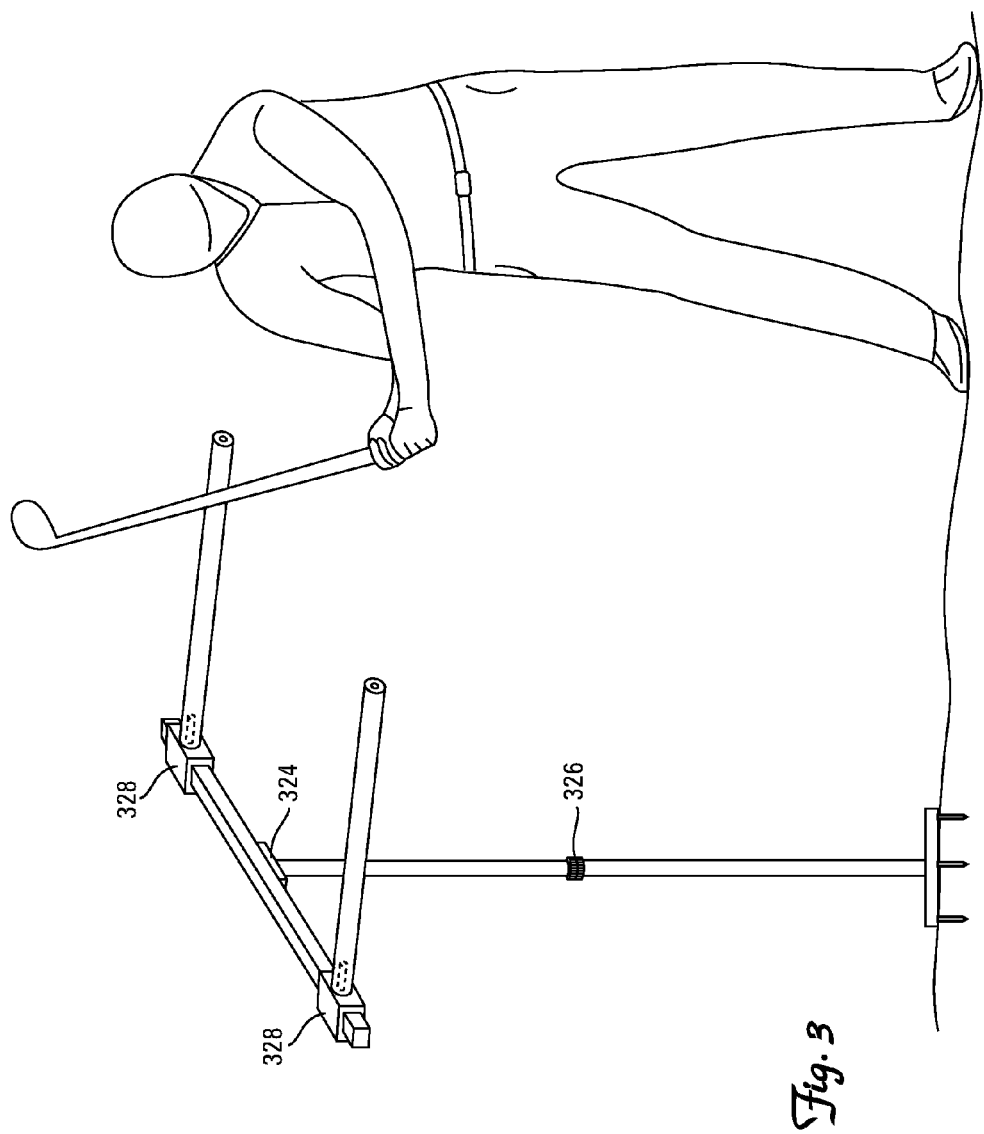
FIG. 3 is a stick figure side view of a golfer taking a golf iron back through one embodiment of a device of the present invention with the lateral support arm tilted with respect to the support surface (the ground).

FIG. 3 is a stick figure side view of a right handed golfer 302 taking a golf iron 304 back through one embodiment of a device of the present invention 306 with the lateral support arm 308 tilted with respect to the support surface (the ground) 310. Sleeve 312b is shown raised higher than sleeve 312a by tilting of the lateral support arm 322 with respect to the vertical support element 314. To adjust the height of the connection point 324 between the lateral support arm 322 and the vertical support element 314, the vertical support element 314 is embedded deeper into the ground 310 or pulled upward to be less embedded in the ground 310 thereby changing the elevation of the connection point 324.

In a preferred embodiment, telescoping clamp 326 allows for simple raising and lowering of connection point 324 to adjust for golfers' height and swing characteristics. Greater degree of tilting of the lateral support arm 322 effectively narrows a pathway for movement of the golf iron 304 both during the takeaway and during the forward swing of the golf iron 304. This can be achieved, for example, by ball swivel head 324. In a preferred embodiment, for a right handed golfer, the inner sleeve 312b will be lower to support surface (the ground) than 312a to promote a more effective in-out club path swing. Additionally, sliding golf sleeves 312a and 312b closer together by moving slider elements 328 and direction arms 320 will allow for increased difficulty of golfer being able to swing the golf club between sleeves 312b and 312a. The upper golf sleeve 312b is shown with an opening of a hole 316 through the sleeve 312b to allow the sleeve 312b to be slid over the direction arm 320. The lower sleeve 312a is shown with a slit 318 along the entire length of the sleeve 312a so that (as in FIG. 1B), the sleeve 312a may be pressed over a direction arm (not shown for 312a).

By adjusting the height of the center of the lateral support arm and degree of tilting of the lateral support arm, the device may be used to address golf club positions during different parts of the swing. The device may fine tune the training by closing the relative width of a through path between sleeves by different degrees of tilting of the lateral support arm or other orientation changes of the directional arms. By having the sleeves extend away from relatively shorter direction arms (as shown in elements 320 and 312b in FIG. 3), the sleeve may flex or be dislodged without significant resistance or impact on the golf club. This can be important as significant resistance (e.g., if striking a rigid bar instead of the soft, resilient sleeve) can develop a sense of negative anticipation during the swing that can cause tension or create bad habits (e.g., an expectant break in a swing). Also, where the sleeve is resilient and has a soft surface, the golfer will not damage the club or fear injury to his body when swinging the club at maximum effort. Therefore the device is safe for training golfers with existing sensitivity in the hands, wrists, arms, elbows, shoulders and back.

On skilled in the relevant arts, will understand that alternative constructions and designs may be used within the generic scope of the invention as described herein.

FIG. 4 is a perspective view of a training system 400 having telescoping vertical support element 406 having multiple prongs 492 on a base 404 for insertion in the ground 430 for stabilization, an adjustable lateral support arm 412, and adjustable vertical riser arms 416a 416b, and adjustable directional arms 422a 422b with soft tubular elements 420a 420b. The adjustable lateral support arm 412 and adjustable vertical riser arms 416a 416b are illustrated as being slideably coupled through coupling sleeves 414a 414b which may be rigid or have rotational or flexible capability, as would the coupler for the telescoping vertical support element 406 (with telescoping connecting coupler 408 to the adjustable lateral support arm 412. The adjustable vertical riser arms 416a 416b may have rigid, flexing or rotating connectors 418a 418b engaging the adjustable vertical riser arms 416a 416b to the adjustable directional arms 422a 422b with soft tubular elements 420a 420b. The connectors 418a 418b may be mechanical step controlled, elastic memory-accepting polymers or the like, so that the adjustable directional arms 422a 422b with soft tubular elements 420a 420b can be oriented as desired.

FIG. 5 is a perspective view of a training device 500 with a non-telescoping linear vertical support 502 with vertically elevating horizontal support members 506a 506b and adjustable horizontal support members 510a 510b with directional soft tubular elements 512a 512b. Connectors 504a 504b may slide vertically (and may pronate) on the linear vertical support 502, and connectors 508a 508b slide horizontally (and may pronate) on the linear vertically elevating horizontal support members 506a 506b.

Many variations within the ordinary skill of the artisan may be used within the generic scope of the present technology. Even though one user might prefer a trip system of support, as this enables indoor use as well as outdoor use, the single pole, telescoping or not, may be preferred for outdoor use as this can provide multiple ways of initially positioning height and angle of the vertical support element by the angle and depth at which it is inserted in the ground. It also allows for facilitated use on sloped surfaces (inclines, side hill lies, downhill lies, and other out-of-position terrains), where a tripod might not be as easily positioned.

The materials for the different elements and components used should always be sufficiently durable as to survive impact, but significant cost differentials may also be used in the selection of the various materials for all or specific ones of the components.

The present invention may also be practiced as a method of training a golfer in mechanics of a golf swing. The method uses a golf swing training device which may include:

a support base for contacting a support surface;

a vertical support element extending upward from the support base;

the vertical support element having a lateral support arm transverse on the vertical support element with a relatively left side and a relatively right side;

the lateral support arm having two directional arms extending in a forward direction away from the lateral support arms; and the lateral support arm having a rotation-enabling connection to the vertical support element so that the relatively left side can be elevated above the relatively right side, and alternatively the relatively right side may be elevated above the relatively left side to alter the individual respective heights of the two arms.

The golfer manually positions a golf club with a shaft in a first position of address, manually executes at least a beginning of a backswing with the golf club elevating the shaft of the golf club through the lateral support arms above the ground between the two arms, a grip on the golf club being elevated from the first position of address below the two arms and a club head of the golf club being elevated above the two arms, the golfer continuing manual movement of the golf club by executing a downswing with the club head passing downward between the two arms with the club head moving towards the first addition of address.

The method may be practiced in a number of ways, as wherein the golfer repeatedly executes a full golf swing by repeatedly executing backswings and down swings with the head of the golf club passing between the two arms. The method my also be practiced wherein the golfer repeatedly executes a full golf swing by repeatedly executing backswings and down swings with the head of the golf club passing between the two arms, with the two arms of the golf training device being rotated at least once relative to each other between consecutive full golf swings.

The golfer may repeatedly execute repeated partial golf swings by repeatedly executing partial backswings and partial down swings with the head of the golf club passing between the two arms.

The golfer may repeatedly executes repeated partial golf swings by repeatedly executing partial backswings and partial down swings with the head of the golf club passing between the two arms, with the two arms of the golf training device being rotated at least once relative to each other between consecutive full golf swings. In this way, the precision of golf club movement may be precisely controlled and muscle memory in the golfer for the swing can be enhanced.

The method may be executed wherein the full golf swing is executed at a speed less than half of which the golfer is capable, wherein the partial golf swing is executed at a speed within 90% of a club head speed of which the golfer is capable.

What is claimed:

1. A method of training a golfer in mechanics of a golf swing using a golf swing training device comprising:
   a support base for contacting a support surface;
   a vertical support element extending upward from the support base;
   the vertical support element having a lateral support arm transverse on the vertical support element with a left side and a right side;
   the lateral support arm having two directional arms extending in a forward direction away from the lateral support arms; and
   the lateral support arm having a rotation-enabling connection to the vertical support element so that the left side is elevated above the relatively right side, and alternatively the right side is elevated above the relatively left side to alter the individual respective heights of the two arms;
   wherein the golfer manually positions a golf club with a shaft in a first position of address, manually executes at least a beginning of a backswing with the golf club elevating the shaft of the golf club through the two directional arms above the ground between the two directional arms, a grip on the golf club being elevated from the first position of address below the two arms and a club head of the golf club being elevated above the two directional arms, the golfer continuing manual movement of the golf club by executing a downswing with the club head passing downward between the two directional arms with the club head moving towards the first position of address.

2. The method of claim 1 wherein the golfer repeatedly executes a full golf swing by repeatedly executing backswings and down swings with the head of the golf club passing between the two arms, with the two arms of the golf training device being rotated at least once relative to each other between consecutive full golf swings.

3. The method of claim 2 wherein the full golf swing is executed at a club head speed less than half of which the golfer is capable.

4. The method of claim 2 wherein the partial golf swing is executed at a speed within 90% of a club head speed of which the golfer is capable.

5. The method of claim 2 wherein the support base comprises an at least three leg base with a central connector engaging the at least three legs and the at least three leg base is placed in a stable position on a horizontal surface before the golfer manually positions the golf club.

6. The device of claim 5 wherein the compressible foam sleeves comprise synthetic polymer foam sleeves that grip respective directional arms so that the foam sleeves will not slide off the respective directional arms when the directional arms are tilted downward at a 60° angle and the compressible sleeve is put into a position relative to length of the respective directional arms before the golfer manually positions the golf club.

7. The method of claim 2 wherein each of the directional arms has a tension gripping compressible sleeve overlaying at least 25% of surface of the directional arms and the compressible sleeve is put into a position before the golfer manually positions the golf club.

8. The method of claim 1 wherein the golfer repeatedly executes repeated partial golf swings by repeatedly executing partial backswings and partial down swings with the head of the golf club passing between the two arms.

9. The method of claim 8 wherein the full golf swing is executed at a club head speed less than half of which the golfer is capable.

10. The method of claim 9 wherein each of the directional arms has a tension gripping compressible sleeve overlaying at least 25% of surface of the directional arms and the compressible sleeve is put into a position before the golfer manually positions the golf club.

11. The method of claim 8 wherein the partial golf swing is executed at a speed within 90% of a club head speed of which the golfer is capable.

12. The method of claim 1 wherein the golfer repeatedly executes repeated partial golf swings by repeatedly executing partial backswings and partial down swings with the head of the golf club passing between the two arms, with the two arms of the golf training device being rotated at least once relative to each other between consecutive full golf swings.

13. The method of claim 12 wherein the lateral support arm is pivoted with respect to the support surface and then locked and unlocked with respect to an angled position parallel to or angled away from the support surface.

14. The method of claim 1 wherein the vertical support element has a lockable, vertically telescoping construction with a contact area between the vertical support element and the lateral support element with respect to the support base that is adjusted vertically before the golfer manually positions the golf club.

15. The method of claim 1 wherein a locking element between the vertical support element and the lateral support element is moved vertically of the lateral support element with respect to the support base along the vertical support element before the golfer manually positions the golf club.

16. The method of claim 15 wherein the compressible foam sleeves comprise synthetic polymer foam sleeves that grip respective directional arms so that the foam sleeves will not slide off the respective directional arms when the directional arms are tilted downward at a 60° angle and the compressible sleeve is put into a position relative to length of the respective directional arms before the golfer manually positions the golf club.

17. The method of claim 1 wherein the lateral support element may swivel from a position parallel with the support surface at least ±60° from the horizontal and the lateral support element is locked into a position before the golfer manually positions the golf club.

18. The method of claim 17 wherein the two directional arms are each separately slid to extend or retract their length and then locked into position along the lateral support arm.

19. The method of claim 1 wherein the two directional arms are each separately slid to extend or retract their length and then locked into position along the lateral support arm.

* * * * *